(12) United States Patent
Okada et al.

(10) Patent No.: US 9,873,528 B2
(45) Date of Patent: Jan. 23, 2018

(54) ROTATION SUPPRESSING DEVICE

(71) Applicant: Astroscale Japan Inc., Tokyo (JP)

(72) Inventors: Mitsunobu Okada, Singapore (SG); Masato Otsubo, Chigasaki (JP)

(73) Assignee: ASTROSCALE JAPAN INC., Tokyo (JP)

( * ) Notice: Subject to any disclaimer, the term of this patent is extended or adjusted under 35 U.S.C. 154(b) by 176 days.

(21) Appl. No.: 15/027,684

(22) PCT Filed: Sep. 19, 2014

(86) PCT No.: PCT/JP2014/074953
§ 371 (c)(1),
(2) Date: Apr. 6, 2016

(87) PCT Pub. No.: WO2015/053063
PCT Pub. Date: Apr. 16, 2015

(65) Prior Publication Data
US 2016/0244190 A1 Aug. 25, 2016

(30) Foreign Application Priority Data
Oct. 7, 2013 (JP) ................. 2013-210466

(51) Int. Cl.
*B64G 1/24* (2006.01)
*B64G 1/66* (2006.01)
*B64G 1/64* (2006.01)
*F16D 61/00* (2006.01)
*F16D 63/00* (2006.01)
*B64G 1/28* (2006.01)
*B64G 1/42* (2006.01)

(52) U.S. Cl.
CPC ............... *B64G 1/24* (2013.01); *B64G 1/646* (2013.01); *B64G 1/66* (2013.01); *F16D 61/00* (2013.01); *F16D 63/00* (2013.01); *B64G 1/283* (2013.01); *B64G 1/421* (2013.01)

(58) Field of Classification Search
CPC .......... B64G 1/24; B64G 1/283; B64G 1/646; B64G 1/66; B64G 1/421; F16D 61/00; F16D 63/00
See application file for complete search history.

(56) References Cited

U.S. PATENT DOCUMENTS 4,259,876 A * 4/1981 Belyanin .................. B25J 9/046
414/7
8,967,548 B2 * 3/2015 Goff ....................... B64G 1/646
244/172.4

(Continued)

FOREIGN PATENT DOCUMENTS

JP   H08-071964 A   3/1996
JP   2010-069973 A  4/2010
JP   2011-168270 A  9/2011

*Primary Examiner* — Justin M Benedik

(57) ABSTRACT

A rotation suppressing device 1 includes: a body 10; a shaft 20 extending outward from the body 10 and configured to rotate about a first rotation axis $A_1$; a rotation part 30 configured to rotate about a second rotation axis $A_2$ together with the shaft 20; a capture part 40 fixed to the rotation part 30 and configured to capture space debris D; a braking part 50 configured to suppress rotation of the shaft 20; and a body rotation suppressing part 60 configured to suppress rotation of the body 10 occurring when the braking part 50 operates.

8 Claims, 1 Drawing Sheet

(56) References Cited

U.S. PATENT DOCUMENTS

| | | | |
|---|---|---|---|
| 2010/0193640 A1* | 8/2010 | Atmur | B64G 1/242 |
| | | | 244/158.2 |
| 2011/0198446 A1* | 8/2011 | Knirsch | B64G 1/1078 |
| | | | 244/171.7 |
| 2011/0198448 A1 | 8/2011 | Knirsch et al. | |
| 2012/0076629 A1* | 3/2012 | Goff | B25J 9/1612 |
| | | | 414/730 |
| 2012/0078829 A1 | 3/2012 | Goff et al. | |
| 2013/0249229 A1* | 9/2013 | Roberts | B25J 15/0226 |
| | | | 294/198 |

* cited by examiner

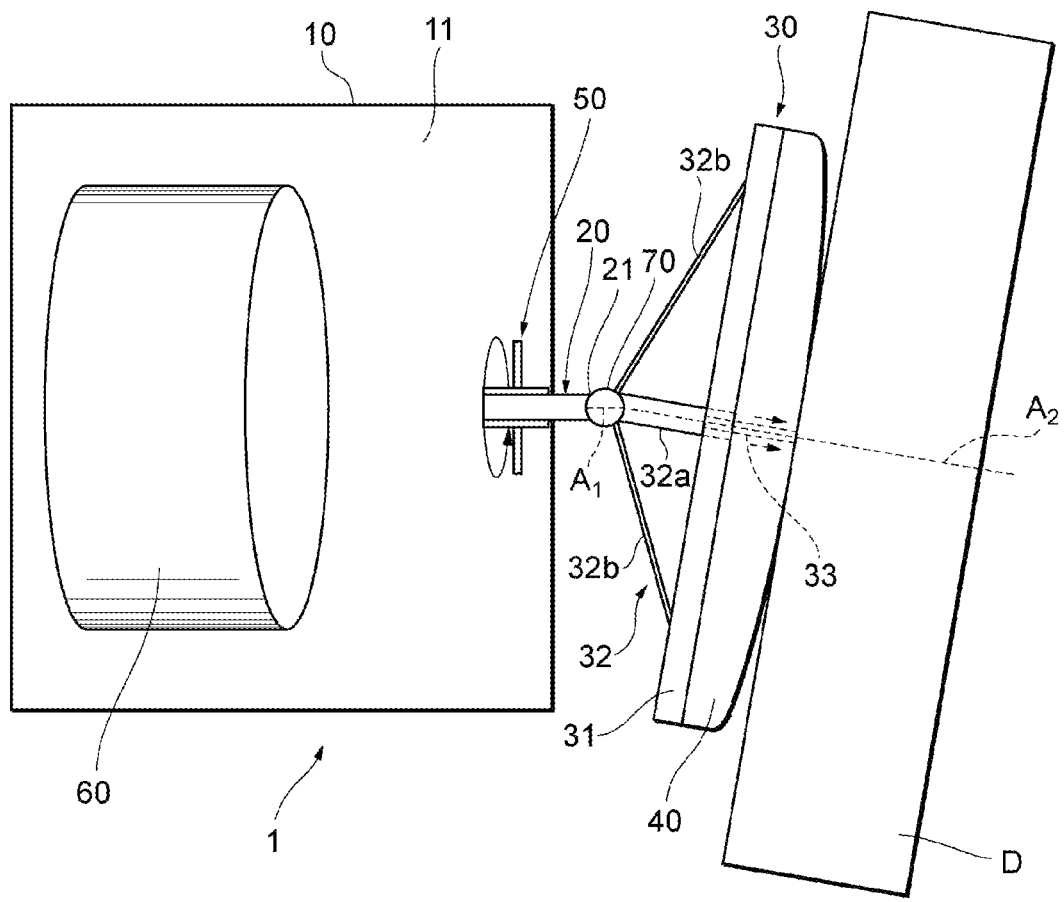

ROTATION SUPPRESSING DEVICE

This application is a U.S. National Stage of International Patent Application No. PCT/JP2014/074953, filed Sep. 19, 2014, which claims the benefit of Japanese Patent Application No. 2013-210466, filed on Oct. 7, 2013, the disclosures of which are incorporated herein by reference in their entirety.

TECHNICAL FIELD

The present invention relates to a rotation suppressing device.

BACKGROUND ART

It is currently known that artificial satellites that were launched in the past and having completed their missions or damaged, broken pieces of such artificial satellites, and the wreckages such as upper stages of rockets are present as space debris in orbits of the earth. The space debris might collide against normal space stations or artificial satellites during their missions to damage the space stations or the artificial satellites. Thus, various techniques for removing debris from orbits to incinerate or collect the debris have been proposed.

In a proposed technique, for example, minute space debris is negatively charged by using plasma environments of aerospace, and an electric field is applied to a direction that decelerates the speed of the debris so that the debris decreases in altitude to enter the atmosphere of the earth and is eliminated by incineration (see Patent Document 1). In recent years, a technique for collecting space debris by using a device for eliminating debris configured by covering a foam material with a jacket of layers of fabric has been proposed (see Patent Document 2). This technique is intended to cause space debris to strike the jacket to be broken so that the broken pieces of debris are captured and bound by the foam material.

CITATION LIST

Patent Documents

Patent Document 1: JP2010-069973 A
Patent Document 2: JP2011-168270 A

SUMMARY

Technical Problem

The techniques described in Patent Documents 1 and 2, however, are used to incinerate and collect minute space debris or relatively small space debris, and are not suitable for eliminating relatively large space debris. There are still difficulties in eliminating relatively large space debris because techniques for approaching target debris and for collecting and suppressing rotation of the debris have not been established yet, and cost-effectiveness is insufficient, for example. In particular, relatively large space debris often rotates about an axis (or axes), and a technique for suppressing such rotational motion is urgently needed.

The present invention has been made in view of the foregoing problems, and has an object of providing a rotation suppressing device that can effectively suppress rotational motion of a target in aerospace.

Solution to Problem

To achieve the object, a rotation suppressing device according to the present invention is a device for suppressing rotation of a target in aerospace (i.e., an artifact such as space debris or artificial satellite in trouble), and includes: a body; a shaft extending outward from the body and configured to rotate about a first rotation axis; a rotation part attached to an end of the shaft opposite to the body and configured to rotate about a second rotation axis together with the shaft; a capture part fixed to the rotation part and configured to capture the target; a braking part provided in the body and configured to suppress rotation of the shaft; and a body rotation suppressing part configured to suppress rotation of the body occurring when the braking part operates. The body rotation suppressing part may be a reaction wheel provided inside the body, for example.

With this configuration, the capture part can capture a target (i.e., an artifact such as space debris or an artificial satellite in trouble), and the rotation part fixed to the capture part and the shaft attached to the rotation part can rotate together with the target. Then, the braking part gradually suppresses rotation of the shaft, and the body rotation suppressing part suppresses rotation of the body occurring when the braking part operates. That is, the capture part, for example, rotates integrally with the target, and this rotation is suppressed by the braking part, thereby suppressing rotation of the body occurring when the braking part operates (i.e., an angular momentum of the target is moved to the body rotation suppressing part and absorbed therein with the position of the body maintained). As a result, rotational motion of a target that is relatively large (has a large angular momentum) can be effectively suppressed.

In the rotation suppressing device according to the present invention, the rotation part may include a circular plate and a coupling part coupling the circular plate to the end of the shaft. In this case, the capture part may include an adhesive agent fixed to a surface of the circular plate.

With this configuration, the rotation part is constituted by coupling the circular plate to the end of the shaft opposite to the body through the coupling part, and the capture part is constituted by fixing the adhesive agent to the surface of the circular plate.

In the rotation suppressing device according to the present invention, the coupling part may include a cylindrical member connecting the circular plate to the end of the shaft. In this case, a projection member configured to project toward the adhesive agent may be provided inside the cylindrical member.

With this configuration, the projection member projects from the inside of the cylindrical member toward the adhesive agent so that the target captured by the adhesive agent can be removed from the adhesive agent.

In the rotation suppressing device according to the present invention, a thermal insulator may be disposed between the circular plate and the adhesive agent.

With this configuration, heat of the target can be blocked by the thermal insulator disposed between the circular plate and the adhesive agent so that heat transmission between the shaft or the body and the target can be prevented and thermal control of the body can be eased.

In the rotation suppressing device according to the present invention, the first rotation axis and the second rotation axis may be a common rotation axis.

With this configuration, the rotation axis (first rotation axis) of the shaft and the rotation axis (second rotation axis)

of the rotation part can be used as a common rotation axis. Thus, the configuration of the device can be simplified.

In the rotation suppressing device according to the present invention, the shaft and the rotation part may rotate together in a state in which the first rotation axis and the second rotation axis form a predetermined angle. In this case, the angle formed by the first rotation axis and the second rotation axis may be changeable.

With this configuration, the shaft and the rotation part can rotate together in the state in which the rotation axis (first rotation axis) of the shaft and the rotation axis (second rotation axis) of the rotation part form a predetermined angle (i.e., the rotation part tilts with respect to the shaft), and this angle can be changed. Thus, in capturing the target by the capture part, the rotation part can be tilted in accordance with the shape and position of the target, and in this state, the rotation part and the shaft can rotate. Thus, the rotation suppressing device can be used in various situations. As a result, the probability of capturing the target can be increased.

In the rotation suppressing device according to the present invention, the braking part may include a power generating unit that converts heat generated in suppressing rotation of the shaft to electricity.

With this configuration, heat generated in suppressing rotation of the shaft can be effectively used for power generation.

Advantageous Effects of Invention

The present invention can provide a rotation suppressing device that can effectively suppress a rotational motion of a target in aerospace.

BRIEF DESCRIPTION OF DRAWING

FIG. 1 is a view illustrating a configuration of a rotation suppressing device according to the present invention.

DESCRIPTION OF EMBODIMENTS

A rotation suppressing device 1 according to an embodiment of the present invention will be described hereinafter with reference to the drawing.

First, a configuration of the rotation suppressing device 1 according to the embodiment will be described with reference to FIG. 1. The rotation suppressing device 1 is attached to an aerospace vehicle such as a rocket. After the aerospace vehicle has been launched into aerospace, the rotation suppressing device 1 is separated from the aerospace vehicle and suppresses rotation of space debris D (target) in aerospace. The rotation suppressing device 1 may be configured in such a manner that the rotation suppressing device 1 mounted on an unillustrated relatively large mother ship is attached to the aerospace vehicle, launched into aerospace together with the mother ship, and released from the mother ship (i.e., functions as a so-called "child ship"). Alternatively, the rotation suppressing device 1 may be an integrated unit of a mother ship and a child ship (i.e., the mother ship and the child ship are not separated).

The rotation suppressing device 1 includes a body 10 in the shape of a casing, a shaft 20 extending outward from the body 10 and configured to rotate about a first rotation axis $A_1$, a rotation part 30 attached to the shaft 20 and configured to rotate about a second rotation axis $A_2$ together with the shaft 20, a capture part 40 configured to capture space debris D, a braking part 50 configured to suppress rotation of the shaft 20, and a body rotation suppressing part 60 configured to suppress rotation of the body 10 occurring when the braking part 50 operates.

The body 10 includes a storage space 11 for housing various types of electronic equipment, for example. The braking part 50 and the body rotation suppressing part 60 are housed in the storage space 11. The shape of the body 10 is not specifically limited, and may be a cube, a cuboid, a cylinder, or a polygonal cylinder, for example. The size of the body 10 may be appropriately set depending on the size of an aerospace vehicle or a mother ship on which the body 10 is mounted.

The shaft 20 is attached to the body 10 in such a manner that the shaft 20 rotates about the first rotation axis $A_1$ with an unillustrated bearing member, for example, interposed therebetween. As illustrated in FIG. 1, a part of the shaft 20 (a part having a predetermined length and extending from an end 21 opposite to the body 10) projects outward from the body 10. The end 21 of the shaft 20 opposite to the body 10 is provided with a tilt mechanism 70 for tilting the rotation part 30 relative to the shaft 20. The tilt mechanism 70 may be, for example, a mechanism for performing smooth torque transmission in which the rotation axis $A_1$ of the shaft 20 and the rotation axis $A_2$ of the rotation part 30 rotate with constant velocity even when the angle formed by the rotation axes $A_1$ and $A_2$ changes (a universal joint mechanism).

The capture part 40 functions to capture space debris D. In this embodiment, the capture part 40 is an adhesive agent (e.g., silicone adhesive agent) that is fixed to the surface of a circular plate 31 of the rotation part 30 and bonds space debris D. In the case of using the silicone adhesive agent as the capture part 40, the silicone adhesive agent, which itself has thermal insulating properties, can insulate heat transmitted from space debris D.

The rotation part 30 includes the circular plate 31 having a predetermined thickness and a circular shape in plan view, and a coupling part 32 (constituted by a cylindrical member 32a and a plurality of rod members 32b) coupling the circular plate 31 to the tilt mechanism 70 provided at the end 21 of the shaft 20. The rotation part 30 is configured to rotate about the second rotation axis $A_2$ together with the shaft 20. In this embodiment, the circular plate 31 is made of a metal.

A thermal insulator may be disposed between the circular plate 31 and the capture part 40 (adhesive agent) to further enhance thermal insulating properties. In this case, heat of space debris D can be blocked by the thermal insulator disposed between the circular plate 31 and the capture part 40 so that heat transmission between the shaft 20 or the body 10 and the space debris D can be prevented and thermal control of the body 10 can be eased.

The rotation part 30 constituted by the circular plate 31 and the coupling part 32 preferably has a very light weight. The light weight of the rotation part 30 can ease rotation of the rotation part 30 to reduce an impact of contact when space debris D contacts the rotation part 30, and thereby, the probability of capturing the space debris D (bonding the adhesive agent) can be significantly increased.

In this embodiment, the coupling part 32 including the cylindrical member 32a connecting the circular plate 31 to the end 21 of the shaft 20 is employed, and a rod-like projection member 33 projecting toward the adhesive agent is provided inside the cylindrical member 32a. The projection member 33 is configured to reach space debris D through the adhesive agent. The projection member 33 projects from the inside of the cylindrical member 32a toward the adhesive agent so that space debris D captured by the adhesive agent can be removed from the adhesive agent.

In a case where an artificial satellite or other targets except space debris D is captured by the adhesive agent and conveyed to a predetermined location, the projection member 33 can project after the conveyance of the artificial satellite or other targets so that the artificial satellite or other targets can be removed from the adhesive agent.

The braking part 50 functions to suppress rotation of the shaft 20, and is disposed inside the storage space 11 of the body 10. The braking part 50 may be a friction-type braking device that suppresses rotation of the shaft 20 by a frictional force. The friction-type braking device may be a functional hydrodynamic braking device that suppresses rotation by using a frictional force of an functional fluid whose viscosity changes due to an externally applied physical action (e.g., an electrorheological (ER) fluid whose viscosity changes due to an externally applied electric field or a magnetic (MR) fluid whose viscosity changes due to an externally applied magnetic field), in addition to a disk-oriented braking device, a drum-type braking device, and a band-type braking device. The braking part 50 may include a power generating unit that converts heat generated in suppressing rotation of the shaft 20 to electricity. Such a configuration enables heat generated in suppressing rotation of the shaft 20 to be effectively used for power generation.

The body rotation suppressing part 60 functions to suppress rotation of the body 10 occurring when the braking part 50 operates. In this embodiment, the body rotation suppressing part 60 is a reaction wheel provided inside the storage space 11 of the body 10. In a case where the body 10 rotates for a long period, rotation of the reaction wheel for canceling the rotation is accumulated to approach the limit thereof in some cases. To prevent this, a mechanism for canceling accumulated rotation of the reaction wheel (e.g., a magnetotorquer or a thruster) may be provided.

The rotation suppressing device 1 also includes an unillustrated control part for controlling operations of components. The control part can control an operation of the braking part 50 in accordance with a rotation speed of the shaft 20 or control an operation of the body rotation suppressing part 60 in accordance with a rotation speed of the body 10.

Then, it will be described how the rotation suppressing device 1 according to this embodiment is used.

First, the aerospace vehicle on which the rotation suppressing device 1 is mounted is launched, and the rotation suppressing device 1 approaches target space debris D to inspect the space debris D with respect to, for example, a rotation axis, an angular velocity, and a weight. Then, the space debris D is bonded to and captured by the adhesive agent that is the capture part 40 of the rotation suppressing device 1 (debris capturing step). Then, the capture part 40 to which the space debris D is bonded and the rotation part 30 to which the capture part 40 is fixed rotate about the second rotation axis $A_2$ together with the space debris D, and this rotation is transmitted to the shaft 20 through the tilt mechanism 70 so that the shaft 20 rotates about the first rotation axis $A_1$.

The control part of the rotation suppressing device 1 detects the rotation of the shaft 20 to cause the braking part 50 to operate, and suppresses rotation of the shaft 20 while controlling an operation of the braking part 50 in accordance with the rotation speed of the shaft 20 (shaft rotation suppressing step). In this manner, when the braking part 50 operates, a reaction force acts so that the body 10 starts rotating. The control part of the rotation suppressing device 1 detects rotation of the body 10 to cause the body rotation suppressing part 60 to operate, and suppresses rotation of the body 10 while controlling an operation of the body rotation suppressing part 60 in accordance with the rotation speed of the body 10 (body rotation suppressing step). In this manner, rotational motion of the space debris D is gradually attenuated.

In the rotation suppressing device 1 according to this embodiment described above, the capture part 40 captures space debris D, and the rotation part 30 fixed to the capture part 40 and the shaft 20 attached to the rotation part 30 can rotate together with the space debris D. Then, the rotation of the shaft 20 is gradually suppressed by the braking part 50, and rotation of the body 10 occurring when the braking part 50 operates can be suppressed by the body rotation suppressing part 60. That is, the capture part 40, for example, is caused to rotate integrally with the space debris D, and this rotation is suppressed by the braking part 50, thereby suppressing rotation of the body 10 occurring when the braking part 50 operates (an angular momentum of the space debris D is moved to the body rotation suppressing part 60 and absorbed therein with the position of the body 10 maintained). Consequently, rotational motion of space debris D that is relatively large (has a large angular momentum) can be effectively suppressed by the relatively small body 10.

In the rotation suppressing device 1 according to this embodiment described above, the projection member 33 is provided inside the cylindrical member 32a connecting the circular plate 31 to the end 21 of the shaft 20, and the projection member 33 projects from the inside of the cylindrical member 32a toward the adhesive agent (capture part 40). Thus, space debris D captured by the adhesive agent can be removed from the adhesive agent.

In the rotation suppressing device 1 according to this embodiment described above, the shaft 20 and the rotation part 30 can rotate together in a state in which the rotation axis (first rotation axis $A_1$) of the shaft 20 and the rotation axis (second rotation axis $A_2$) of the rotation part 30 form a predetermined angle (i.e., the rotation part 30 tilts with respect to the shaft 20), and this angle can be changed. Thus, in capturing space debris D by the capture part 40, the rotation part 30 can be tilted in accordance with the shape and position of the space debris D, and in this state, the rotation part 30 and the shaft 20 can rotate. Thus, the rotation suppressing device 1 can be used in various situations. As a result, the probability of capturing space debris D can be increased.

In the example of the embodiment described above, the rotation axis (first rotation axis $A_1$) of the shaft 20 is different from the rotation axis (second rotation axis $A_2$) of the rotation part 30. Alternatively, the rotation axis of the shaft 20 and the rotation axis of the rotation part 30 may be a common axis. In this case, the configuration of the device can be simplified.

In the example of the embodiment described above, the capture part 40 is an adhesive agent. Alternatively, the capture part 40 may have other configurations that can capture space debris D (e.g., a holding mechanism for holding space debris D or a bonding agent that instantaneously bonds space debris D and then hardens the space debris D).

In the example of the embodiment described above, the target is space debris D. However, a target whose rotation is to be suppressed by the rotation suppressing device 1 is not limited to this example. For example, to inspect and repair an artificial satellite in trouble (artificial satellite that is not space debris), the rotation suppressing device 1 may suppress rotation of this artificial satellite. That is, the target may be an artificial satellite in trouble.

The present invention is not limited to the foregoing embodiment, and design changes made by those skilled in the art on the embodiment are included in the scope of the present invention as long as the changes include features of the present invention. That is, elements, positions, materials, conditions, shapes, sizes, etc. of the elements in the embodiment described above are not limited to the above examples, and may be appropriately modified. The elements of the embodiment may be combined within the range technology allows, and such combinations are included in the scope of the present invention as long as the combinations include features of the present invention.

In a case where the rotation suppressing device 1 includes a propulsion unit such as a thruster, the capture part 40 of the rotation suppressing device 1 is bonded to a target so that an orbit of the target can be changed by using the propulsion unit of the rotation suppressing device 1. In this case, the functions of the braking part 50 and the body rotation suppressing part 60 of the rotation suppressing device 1 are suppressed (or stopped) so that the capture part 40 and the rotation part 30 and the shaft 20 fixed to the capture part 40 can remain rotating together with the target. The orbit of a target may be changed by using the propulsion unit in such a manner that the rotation part 30 and/or the shaft 20 are/is omitted, the capture part 40 is directly fixed to the body 10, the capture part 40 is bonded to the target, and the capture part 40 and the body 10 remain rotating together with the target.

REFERENCE SIGNS LIST 1 rotation suppressing device
10 body
20 shaft
21 end opposite to body
30 rotation part
31 circular plate
32 coupling part
32a cylindrical member
33 projection member
40 capture part
50 braking part
60 body rotation suppressing part
$A_1$ first rotation axis
$A_2$ second rotation axis
D space debris (target)

What is claimed is:

1. A device for suppressing rotation of a target in aerospace, the device comprising:
    a body;
    a shaft extending outward from the body and configured to rotate about a first rotation axis;
    a rotation part attached to an end of the shaft opposite to the body and configured to rotate about a second rotation axis together with the shaft;
    a capture part fixed to the rotation part and configured to capture the target;
    a braking part provided in the body and configured to suppress rotation of the shaft; and
    a body rotation suppressing part configured to suppress rotation of the body occurring when the braking part operates.

2. The rotation suppressing device of claim 1, wherein the rotation part includes a circular plate and a coupling part coupling the circular plate to the end of the shaft, and
    the capture part includes an adhesive agent fixed to a surface of the circular plate.

3. The rotation suppressing device of claim 2, wherein the coupling part includes a cylindrical member connecting the circular plate to the end of the shaft, and
    a projection member configured to project toward the adhesive agent is provided inside the cylindrical member.

4. The rotation suppressing device of claim 2, wherein a thermal insulator is disposed between the circular plate and the adhesive agent.

5. The rotation suppressing device of claim 1, wherein the first rotation axis and the second rotation axis are a common rotation axis.

6. The rotation suppressing device of claim 1, wherein the shaft and the rotation part rotate together in a state in which the first rotation axis and the second rotation axis form a predetermined angle that is changeable.

7. The rotation suppressing device of claim 1, wherein the braking part includes a power generating unit that converts heat generated in suppressing rotation of the shaft to electricity.

8. The rotation suppressing device of claim 1, wherein the body rotation suppressing part is a reaction wheel provided in the body.

* * * * *